United States Patent [19]
Greene et al.

[11] Patent Number: 5,836,013
[45] Date of Patent: Nov. 10, 1998

[54] METHOD AND APPARATUS FOR COMPRESSING SYSTEM READ ONLY MEMORY IN A COMPUTING SYSTEM

[75] Inventors: Todd Michael Greene, Hacienda Heights; John Edward Hallin, Jr., Aliso Viego, both of Calif.

[73] Assignee: Phoenix Technologies Ltd., San Jose, Calif.

[21] Appl. No.: 289,104

[22] Filed: Aug. 11, 1994

[51] Int. Cl.$^6$ ........................................ G06F 9/06
[52] U.S. Cl. ............................................ 395/652
[58] Field of Search ................... 395/700, 650, 395/652, 651, 653, 712

[56] References Cited

U.S. PATENT DOCUMENTS

| | | | |
|---|---|---|---|
| 5,123,098 | 6/1992 | Gunning et al. | 395/400 |
| 5,291,585 | 3/1994 | Sato et al. | 395/500 |
| 5,303,326 | 4/1994 | Dean et al. | 395/2 |
| 5,379,431 | 1/1995 | Lemon et al. | 395/700 |
| 5,455,933 | 10/1995 | Schieve et al. | 395/183.03 |
| 5,459,867 | 10/1995 | Adams et al. | 395/700 |
| 5,463,766 | 10/1995 | Schieve et al. | 395/160 |
| 5,530,847 | 6/1996 | Schieve et al. | 395/183.14 |

*Primary Examiner*—Kevin A. Kriess
*Attorney, Agent, or Firm*—Price, Gess & Ubell

[57] ABSTRACT

A chipset (platform)-independent method and apparatus for compressing and decompressing a system ROM of a computer (e.g., BIOS, setup program, and one or more option ROMs) are disclosed. The setup program, option ROM, and part of the BIOS are compressed using a lossless compression algorithm. A non-compressible portion of the BIOS includes a decompression algorithm and a shadow RAM block table of chipset-specific registers and bit patterns to write-enable and read-enable shadow RAM (RAM that is mapped to the ROM address space). The compressed data is stored in a compressed data block format with the associated location in memory to decompress the compressed data. Thus, the data can be decompressed anywhere in memory of a target computer. For example, the BIOS is decompressed to shadow RAM and the setup program is decompressed to conventional memory. During the BIOS Power-On Self-Test (POST) process, the compressed system ROM is copied to conventional memory, and the decompression program is executed. The decompression program write-enables shadow RAM (with reference to the the chipset-specific information in the shadow RAM block table), copies the non-compressible BIOS from conventional memory to shadow RAM, and read-enables shadow RAM. The decompression program scans the compressed system ROM for compressed data blocks and decompresses the compressed data therein to the associated locations in memory. If compressed data is located in shadow RAM, shadow RAM is enabled for writing and reading with reference to the chipset-specific information in the shadow RAM block table. If compressed data was decompressed to conventional memory space, this space is cleared before exiting the POST process.

28 Claims, 11 Drawing Sheets

METHOD AND APPARATUS FOR COMPRESSING SYSTEM READ ONLY MEMORY IN A COMPUTING SYSTEM

BACKGROUND OF THE INVENTION

1. Field of the Invention

This invention relates to the firmware system ROM file of a computer, and more specifically to a compressed system ROM file that is decompressed into memory.

2. Background of the Invention

The demand for space in the system read only memory (ROM) of personal computers is growing at a rapid rate. The convenience of multiple bus standards, I/O devices on the motherboard, multi-language interfaces, and other functions that are supported in the system ROM, place an increasing burden on the scarce system ROM area of memory.

A larger system ROM is possible, however, this solution significantly increases hardware costs.

Generally, the ROM address space in memory is not written to. However, part of the ROM address space can be configured for so-called "shadow RAM" (RAM that is mapped to the ROM address space). Unfortunately, the specific computer chipset controls the configuration of the ROM address space, and is different for different chipsets. Platform (chipset) specific system ROM compression and decompression code could be developed. However, this additional effort increases firmware design costs and delays development schedules. In turn, personal computer costs are increased and development is delayed. In addition, platform-specific code is more difficult to maintain than platform-independent code.

It would be desirable to have a platform-independent technique for compressing the system ROM, and decompressing the system ROM into the ROM address space when required for use by the computer.

SUMMARY OF THE INVENTION

A system ROM comprises a BIOS, and optionally, a setup program and one or more option ROMs. The BIOS code is separated into compressible and non-compressible code. The non-compressible BIOS code comprises a decompression program. The decompression program comprises a lossless decompression algorithm; functions to enable writing and reading to shadow RAM (RAM that is mapped to the ROM address space); and, a shadow RAM block table that comprises chipset-specific registers and bit patterns to write-enable, read-enable, and disable shadow RAM.

The setup program code, option ROM code, compressible BIOS code, and non-compressible BIOS code are compiled or assembled and linked to create a modified system ROM image. The starting address of the non-compressible BIOS code image in the modified system ROM image is stored. A lossless compression algorithm is used to compress the modified system ROM image (up to the non-compressible BIOS code image address), thereby generating a compressed system ROM image. Compressed data is stored in a compressed data block comprising the compressed data and various associated information including the location in memory to place the compressed data when decompressed. The compressed system ROM is stored in ROM of a target computer.

During the BIOS Power-On Self-Test (POST) process of the target computer, the compressed system ROM image is copied to conventional memory (e.g., RAM), and the decompression program is executed. The decompression program write-enables shadow RAM (with reference to the the chipset-specific information in the shadow RAM block table), copies the non-compressible BIOS code image from conventional memory to shadow RAM, and read-enables shadow RAM. The decompression program scans the compressed system ROM image for compressed data blocks and decompresses the compressed data therein to the associated locations in memory. If data is located in shadow RAM, shadow RAM is write-enabled and read-enabled (with reference to the chipset-specific information in the shadow RAM block table). If compressed data was decompressed to conventional memory, this space is cleared before exiting the POST process.

BRIEF DESCRIPTION OF THE DRAWINGS

FIG. 8b is a continuation of FIG. 8a.

DESCRIPTION OF THE PREFERRED EMBODIMENTS

Introduction

Figure 1:
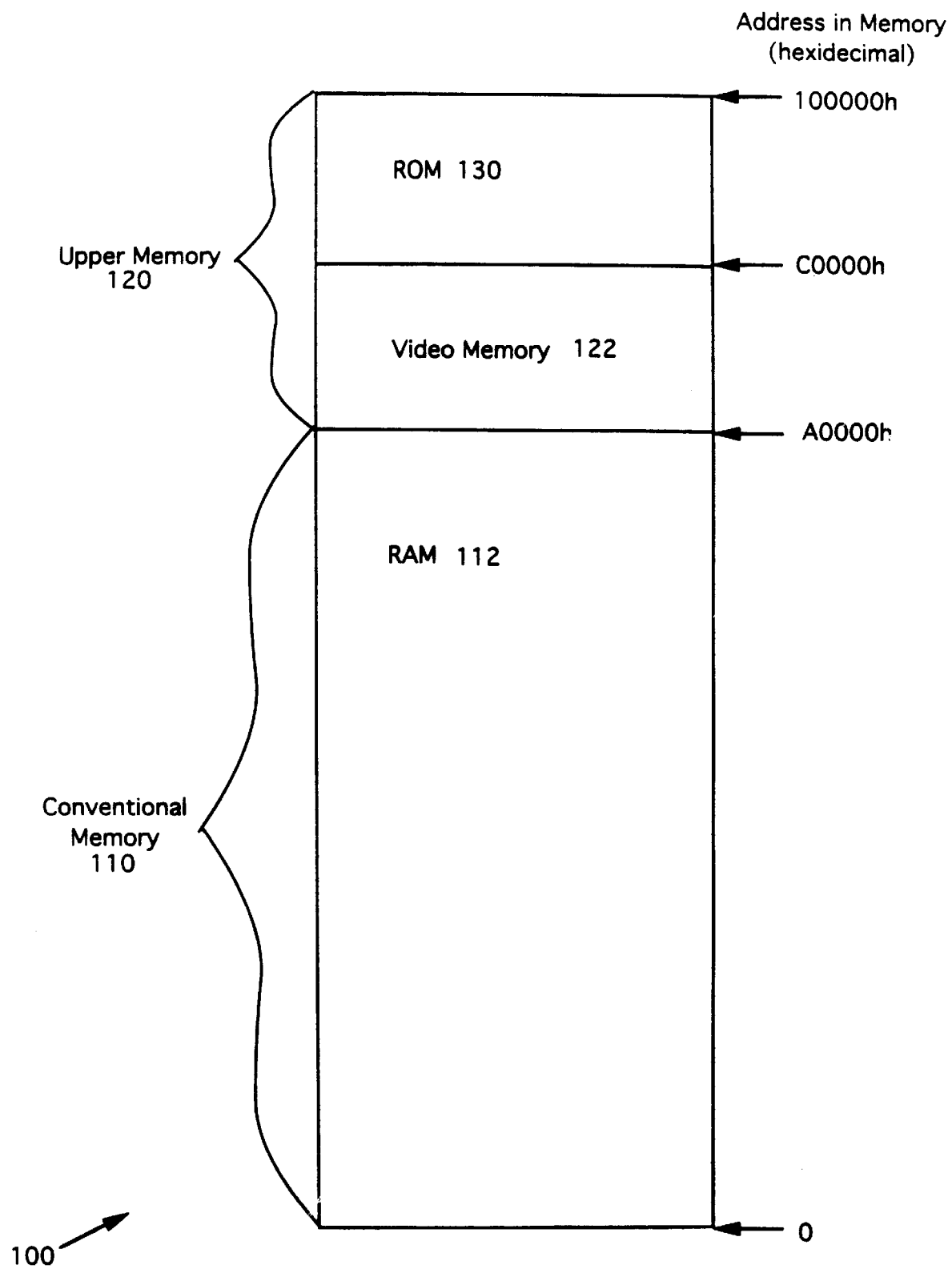
FIG. 1 is a graphical representation of a typical memory map in a personal computer.

FIG. 1 is an example graphical representation of a typical memory map 100 in a computer (e.g., an IBM compatible personal computer, any Intel central processing unit (CPU) -based machine, or similar computing devices). Memory 100 is generally divided into two areas: conventional memory 110 and upper memory 120. Conventional memory 110 comprises a random access memory (RAM) 112 address space that is set aside for use by operating systems and application programs. Conventional memory 110 is, for example, located in the 0 to 9FFFFh (where "h" indicates hexadecimal notation) address range of memory 100. Upper memory 120 is used by the computer hardware. Upper memory 120 is, for example, located in the A0000h to FFFFFh address range of memory 100. The first 128 kilobytes ("K") of upper memory 120 addresses are generally used for video memory 122. The remaining upper memory addresses (e.g., 0000h to 100000h or the end of memory) are set aside for read only memory (ROM) 130.

Figure 2:
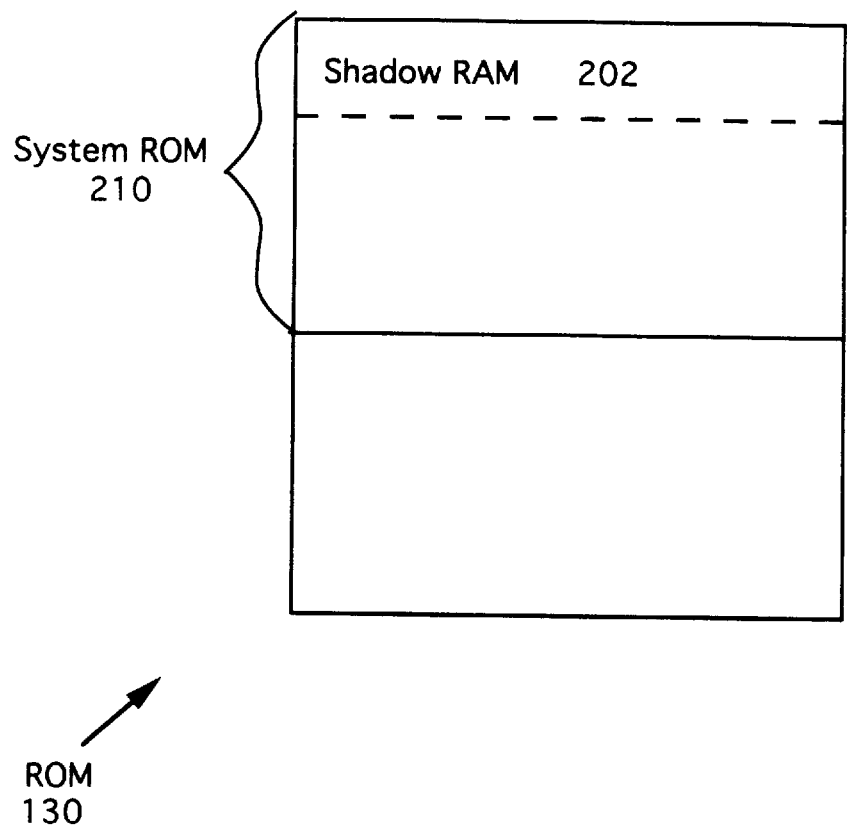
FIG. 2 a graphical representation of a typical memory map of ROM 130 in FIG. 1.

FIG. 2 is an example graphical representation of a typical memory map of ROM 130. ROM 130 may also be configured for "RAM" by mapping RAM to the ROM address space. The RAM in this area is called shadow RAM 202. The ROM space is not used in this case, and the underlying ("shadow") RAM is made available. Generally, the upper portion (e.g., 256K) of upper memory 120 is divided into one or more blocks, and each block can be configured as ROM 130 or RAM. The chipset on the motherboard of the computer controls the configuration of shadow RAM 202. A chipset is one or more very large scale integrated circuits (VLSI) integrated circuits that perform such functions as: cache control, dynamic RAM (DRAM) control, central processing unit (CPU) interface, bus control, and peripheral control. ROM 130 also comprises system ROM 210.

Figure 3:
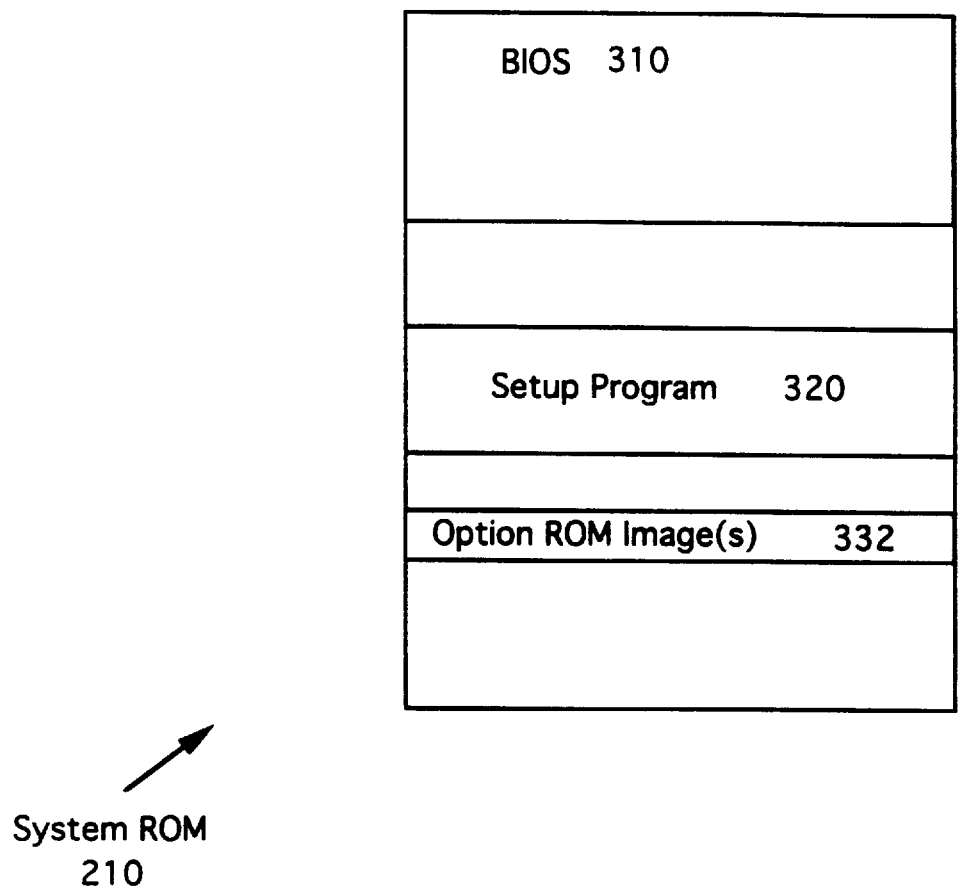
FIG. 3 is a graphical representation of a typical memory map of system ROM 210 in FIG. 2.

FIG. 3 is an example graphical representation of a typical memory map of system ROM 210. System ROM 210 supports various hardware devices associated with the computer. System ROM 210 is located in the upper part of the address space set aside for ROM 130 and is physically located on the motherboard of the computer. System ROM 210 comprises BIOS (Basic Input/Output System) 310, and optionally setup program 320, and one or more option ROM images for input/output (I/O) devices associated with the computer 332. An "image" is a binary representation of code and/or data of a computer file. BIOS 310 comprises a plurality of routines that initialize the computer hardware and provide primitive I/O services that the operating system and application programs use to manipulate hardware associated with the computer. System setup program 320 is a utility that allows the end user to configure BIOS 310. Each option ROM image 332 comprises firmware for an I/O device associated with the computer.

Compression

Figure 4:
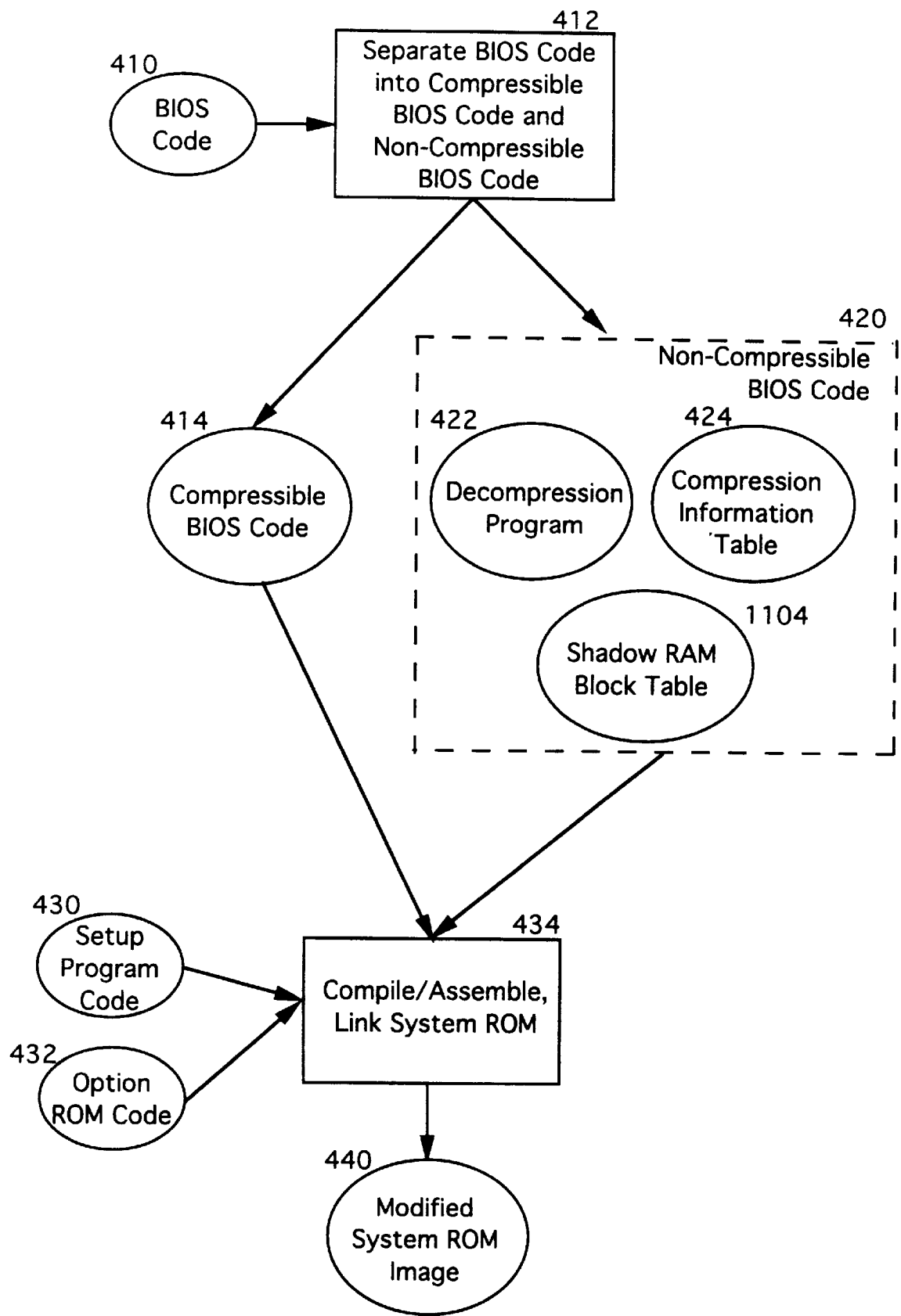
FIG. 4 is a flowchart of a method for generating a modified system ROM image.

FIG. 4 is a flowchart of a method for preparing and generating a modified system ROM image that can be compressed. In a preferred embodiment, the method of FIG. 4 (and continuing in FIG. 6) is implemented on a computing system with a processor and storage. The processor can be any conventional central processing unit (CPU) such as an Intel or Motorola-based CPU. Storage is conventionally coupled to the processor and can be magnetic disk storage, a CD storage unit, or other conventional computer data storage unit.

BIOS code 410, and optionally setup program code 430, and one or more option ROM code modules 432, are each developed, written (e.g., in any computer language such as C or Assembly language) and saved in a computer file. Code and data, as referred to herein, are used interchangeably and comprise computer code and/or data. BIOS code 410 is separated 412 into compressible BIOS code 414 and non-compressible BIOS code 420. Non-compressible BIOS code 420 comprises compression-related information table 424, decompression program 422, and shadow RAM block table 1104.

Compression-related information table 424, comprises, for example, a preferred compression algorithm to use when compressing system ROM image 440 (see below step 630). In a preferred embodiment, compression algorithm is a lossless decompression algorithm, for example, LZSS or LZARI, which are commercially available compression/decompression algorithms. In general, LZSS decompresses faster than LZARI. LZARI generally compresses data better (smaller) than LZSS. For performance reasons, it is suggested that LZARI decompression code be used with an Intel 80486 or better CPU. Table 424 also comprises the start address, A, of non-compressible BIOS code image in system ROM image 440 (see FIG. 5 below).

Figure 10:
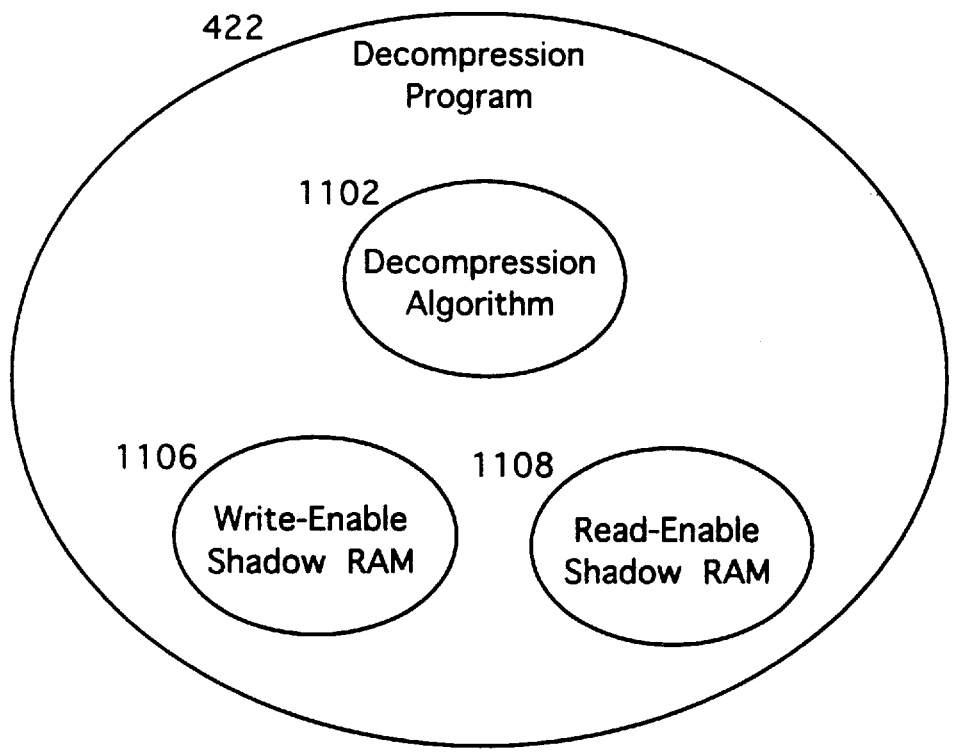
FIG. 10 illustrates one embodiment of selected components in decompression program 422.

Referring to FIG. 10, decompression program 422 comprises a decompression algorithm 1102. Decompression algorithm 1102 corresponds to the compression algorithm used (e.g., LZSS or LZARI). Decompression program also comprises functions to write-enable 1106 and read-enable 1108 shadow RAM 202. Functions 1106, 1108 are chipset (platform) independent.

Before shadow RAM 202 can be written to, it must be write-enabled. Likewise, before shadow RAM 202 can be read from, it must be read-enabled. However, different chipset manufacturers use different registers in the input/output space and different bit patterns to write-enable, read-enable, and disable shadow RAM 202. Therefore, chipset-specific information is provided to access shadow RAM. Functions 1106, 1108 reference shadow RAM block table 1104 that comprises chipset-specific registers and bit patterns to write-enable, read-enable, and disable shadow RAM 202. Thus, to use the present invention in cooperation with any given chipset, only table 1104 need be updated or appended to the system ROM computer file 210—functions 1106, 1108 are chipset independent.

Figure 9:
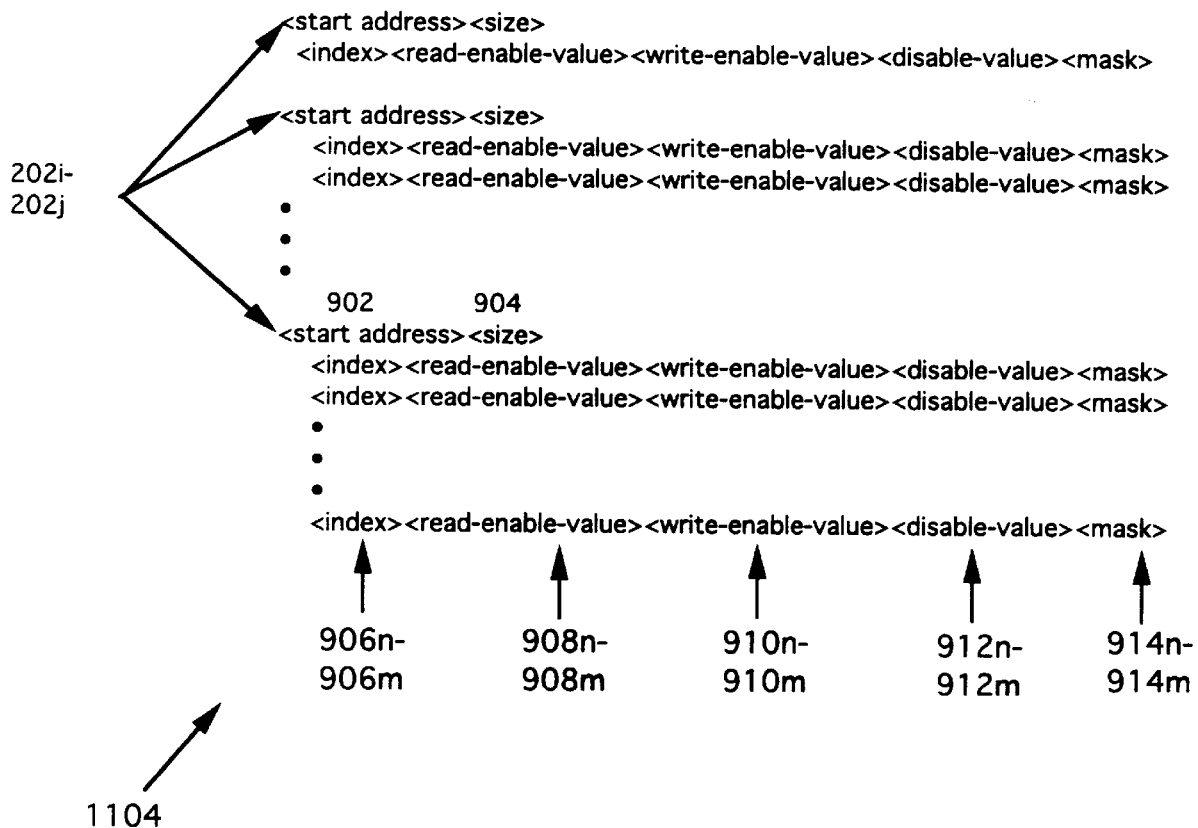
FIG. 9 illustrates one embodiment of the information comprised in table 424.

FIG. 9 shows one embodiment of the information comprised in shadow RAM block table 1104 for a given chipset. All information is obtained from the shadow RAM 202 specifications of the particular manufacturer of the chipset. Each shadow RAM block 202i–202j has a start address 902 in ROM 130 and a size 904. Each RAM block 202i–202j has one or more chipset register indices 906n–906m that are loaded with a certain bit pattern value in order to write-enable 910n–910m, read-enable 908n–908m, or disable 912n–912m shadow RAM block 202i. Mask 914n–914m is used clear the part of the register that is used to set shadow RAM block 202i.

To write-enable shadow RAM 202, table 1104 is referenced and, for each block 202i–202j (defined by address 902), and for each register 906, write-enable value 910 is loaded into register 906. One embodiment of pseudo-code for such a routine 1106 is as follows:

```
write_enable_shadow:
    for each <start address> in shadow_block_table
        if the current shadow block contains data
            for each <index> in the current <start address>
                load chipset index port with <index>;
                AND the chipset data port with NOT <mask>;
                load chipset index port with <index>;
                OR the chipset data port with <write-enable-value>;
    return;
```

Similarly, to read-enable shadow RAM 202, table 1104 is referenced and, for each block 202i–202j, and for each register 906, read-enable value 908 is loaded into register 906. One embodiment of pseudo-code for such a routine 1108 is as follows:

```
read_enable_shadow:
    for each <start address> in shadow_block_table
        if the current shadow block contains data
            for each <index> in the current <start address>
                load chipset index port with <index>;
                AND the chipset data port with NOT <mask>;
                load chipset index port with <index>;
                OR the chipset data port with <read-enable-value>;
    return;
```

Figure 5:
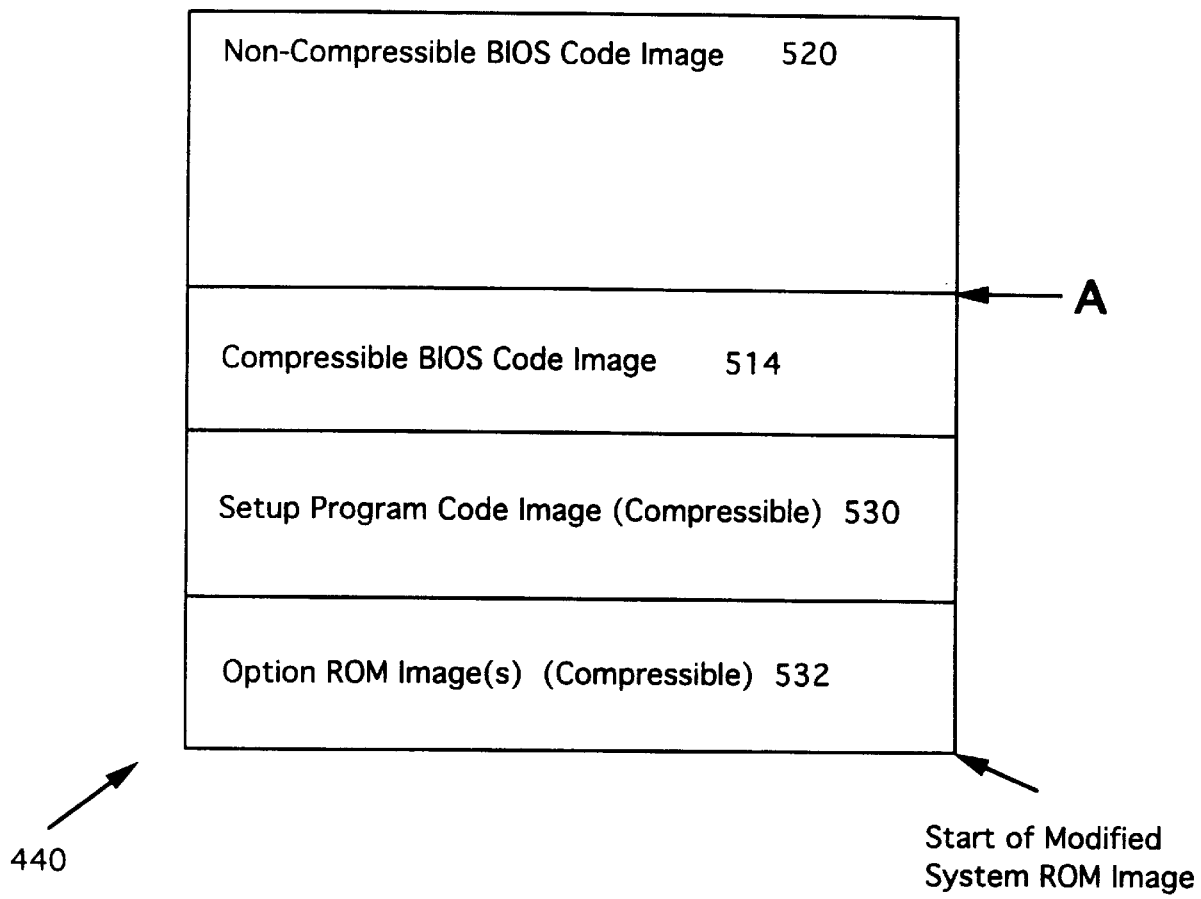
FIG. 5 is a graphical representation of a memory map of modified system ROM image 440 in FIG. 4.

Continuing with FIG. 4, compressible BIOS code 414, non-compressible BIOS code 420 (comprising decompression program 422 (1102, 1106, 1108), compression-related information table 424, and shadow RAM block table 1104), and optionally setup program code 430, and option ROM code module(s) 432, are compiled or assembled and linked 434 to generate a modified system ROM image 440. FIG. 5 is an example graphical representation of modified system ROM image 440 showing code image placement for non-compressible BIOS code image 520, compressible BIOS code image 514, setup program code image 530 (compressible), and option ROM image(s) 532 (compressible). Option ROM image(s) 532 are generally supplied by vendors and added to the compression utility 600 (below). Alternate permutations on the placement of code images in modified system ROM image 440 are also possible. In a preferred embodiment, non-compressible BIOS code image is at the end of modified system ROM image 440 for easy location during compression. Indication A is the start address of non-compressible BIOS code image 520 in modified system ROM image 440 which is stored in compression-related information table 424.

Figure 6:
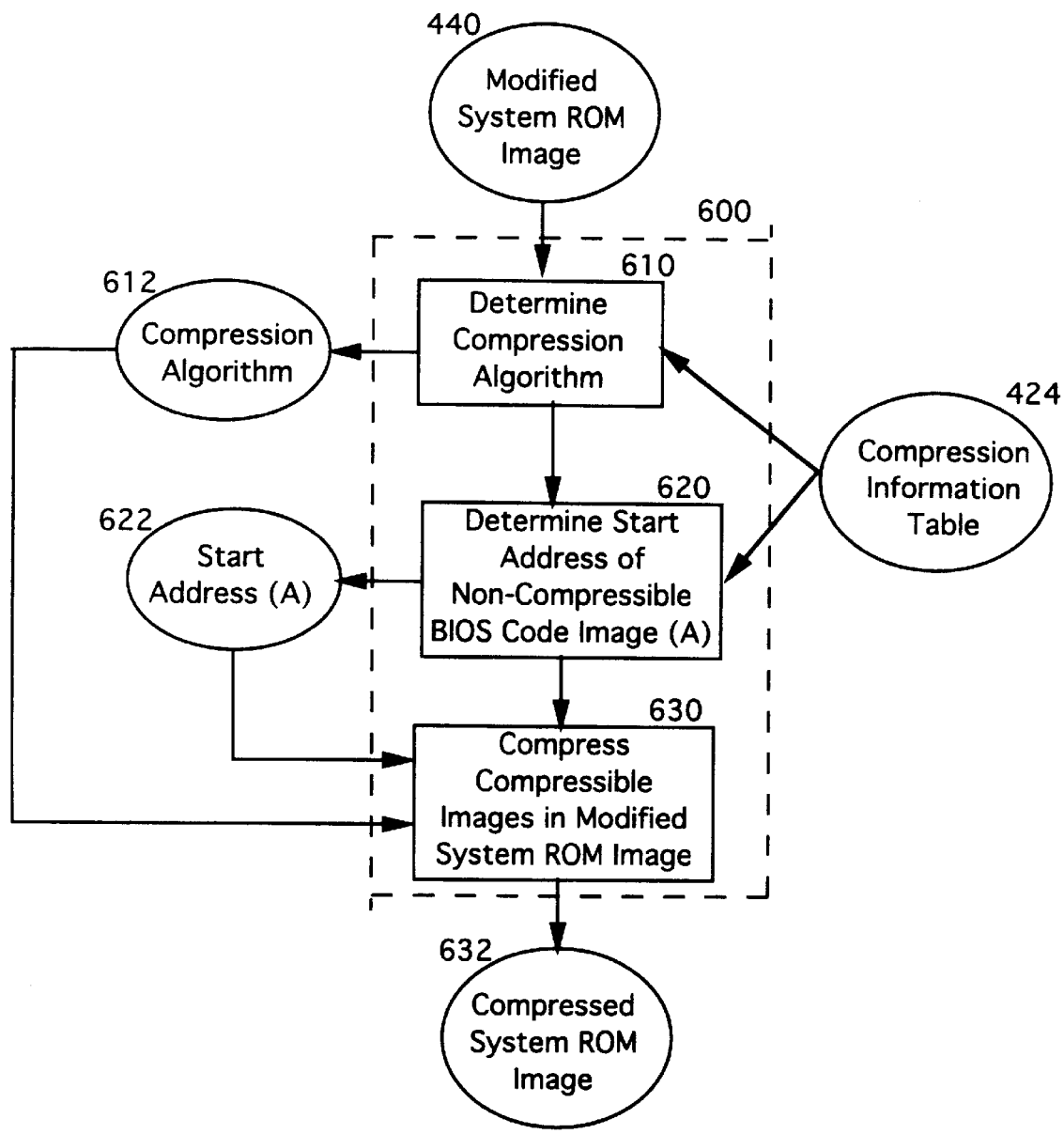
FIG. 6 is a continuation FIG. 4, and is a flowchart of a method to generate a compressed system ROM image.

Referring now to FIG. 6, modified system ROM image 440 is input to compression utility 600. Compression utility 600 uses compression-related information table 424 (in modified system ROM image 440) to determine 610 a compression algorithm 612 to use in compressing modified system ROM image 440. As discussed above, compression algorithm 612 can be any lossless compression algorithm, but must correspond to the decompression algorithm (1102 below) used in the system ROM. Compression utility 600 also uses table 424 to determine 620 the start address, A (622), of non-compressible BIOS code image 520 in modified system ROM image 440.

Knowing the location of non-compressible BIOS code image 520 in modified system ROM image 440, compression utility 600 uses compression algorithm 612 to compress 630 each compressible image (514, 530, 532) in modified system ROM image 440. Each compressed image is stored in a compressed data block 700.

Figure 7:
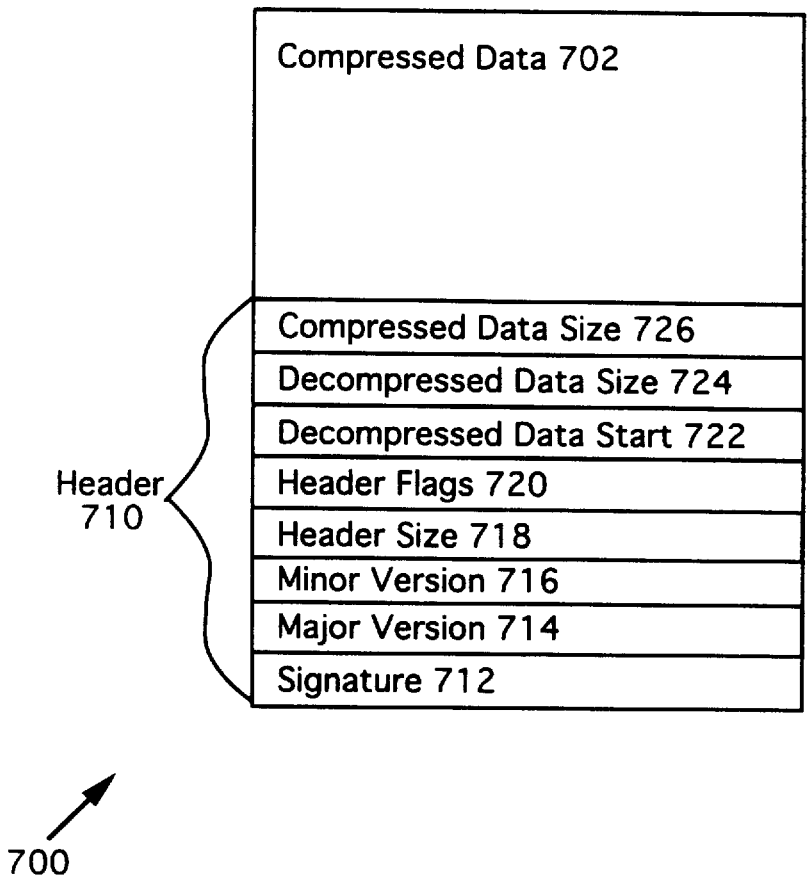
FIG. 7 is a graphical representation of a memory map of a compressed data block.

FIG. 7 is an example graphical representation of a memory map of a compressed data block 700 of a compressed image (e.g., 514, 530, 532). Compressed data block 700 comprises compressed image data 702 and header 710. Compressed image data 702 comprises the compressed binary image of the particular compressible image (e.g., 514, 530, 532). Header 710 comprises associated information about the compressed data image 702 in data block 700. In a preferred embodiment, header 710 comprises the following information: signature 712 (used to find the compressed data block), header major version 714 and header minor version 716 (to track version), header size 718, header flags 720, decompressed data start 722, decompressed data size 724, and compressed data size 726. An indication is made in header flags 720 if compressed data 702 resides in shadow RAM 202 when decompressed. In a preferred embodiment, the destination location in memory 100 (e.g., address space) of decompressed data is specified in decompressed data start 722. Thus, compressed data 702 can be placed anywhere in memory 100 upon decompression.

For example, option ROM image 332 of a VGA (Video Graphic Array) card is expected to start at address C0000h in upper memory 120 (for compatibility reasons). If the VGA card circuitry is placed on the computer motherboard, the option ROM image 332 resides in the system ROM 210. However, the system ROM 210 usually resides in the E0000h to FFFFFh address space of upper memory 120 (which does not include C0000h). Therefore, upon startup, BIOS 310 must copy the VGA option ROM image 332 to the C0000h shadow RAM 202. If the VGA option ROM image 332 is compressed 532, and the decompressed data start address 722 of compressed data 702 is specified as C0000h, decompression program (below) automatically decompresses it into the shadow RAM starting at C0000h.

In another example, decompressed data resides in a 256K block of conventional memory 110 starting 4000h:0 (segment:offset). This block of conventional memory 110 is preferred because other parts of conventional memory 110 are used during the POST process. This block of conventional memory is generally cleared for use just before execution of the INT 19h interrupt instruction in POST. For example, setup program 320, which is not generally used after startup of the computer, can be decompressed into conventional memory 110 during POST. Before the POST process is ended, setup program 320 is cleared from conventional memory 110. In yet another example, compressible BIOS 310 is decompressed to shadow RAM 202.

After compression of compressible images (step 630), the compressed binary image is saved as compressed system ROM image 632. Compressed system ROM image 632 is smaller than modified system ROM image 440. Consequently, less system ROM 210 is required, and thus less ROM 130 is required. Furthermore, since compression utility 600 only compresses raw binary images (as opposed to platform-specific source code), the method is platform independent. If the format of compression related information in table 424 is standard, compression utility 600 can compress any system ROM image 440.

In one embodiment, compression utility 600 (called CRUNCH internal to Phoenix Technologies, Inc., San Jose, Calif.) comprises a plurality of compression options. Example command lines for CRUNCH are:

---

CRUNCH [/S<romsize>[,<imagesize>]] [/M[<segaddr>]]
    [/O<segaddr>:<filename>] <bigimage> <smallimage>
CRUNCH @<responsefile>
<bigimage> is the uncompressed input file (e.g., modified system ROM
    image 440).
<smallimage> is the compressed output file (e.g., compressed
    system ROM image 632).

---

| | |
|---|---|
| /M[<segaddr>] | Tells CRUNCH to move Setup from its default location. The default location of Setup is in front of the BIOS data. Using /M, Setup will be decompressed into the memory block that starts at 4000h:0. Using /M<segaddr>, Setup will be decompressed into the memory block that starts at <segaddr>:0. If Setup is decompressed into conventional memory, this memory will be cleared at the end of POST, just before INT 19h. |
| /O<segaddr>: <optionRomImage> | Specify information about an option ROM to be compressed. This option can be used multiple times. When the option ROM is decompressed, it will be put into the |

-continued

| | |
|---|---|
| | block of memory that starts at <segaddr>:0. <segaddr> can be in conventional memory or shadow memory. If shadow memory is used, the appropriate shadow regions will be enabled. If conventional memory is used, this memory will be cleared at the end of POST, just before INT 19h. |
| /S<romsize> [,<imagesize>] | Specify ROM size and image size. <romsize> is the size of the final image that will go into the ROM. <imagesize> is the size of the image that CRUNCH creates. <imagesize> is used to put uncompressed option ROMs in the final ROM image. If a ROM size is not specified, CRUNCH will make an educated guess. |
| @<responsefile> | Uses a response file for command line options. Response files are often used when the command line length exceeds the 128-character limit imposed by MS-DOS. |

Decompression

Compressed system ROM image 632 is programmed into system ROM 210 which forms part of ROM 130 of a target computer. Target computer comprises memory 100 and a processor (e.g., Intel or Motorola based CPU). Compressed system ROM 632 image must be decompressed before the compressed data therein can be used on the target computer. In a preferred embodiment, decompression is done early in the POST process.

Figure 8A:
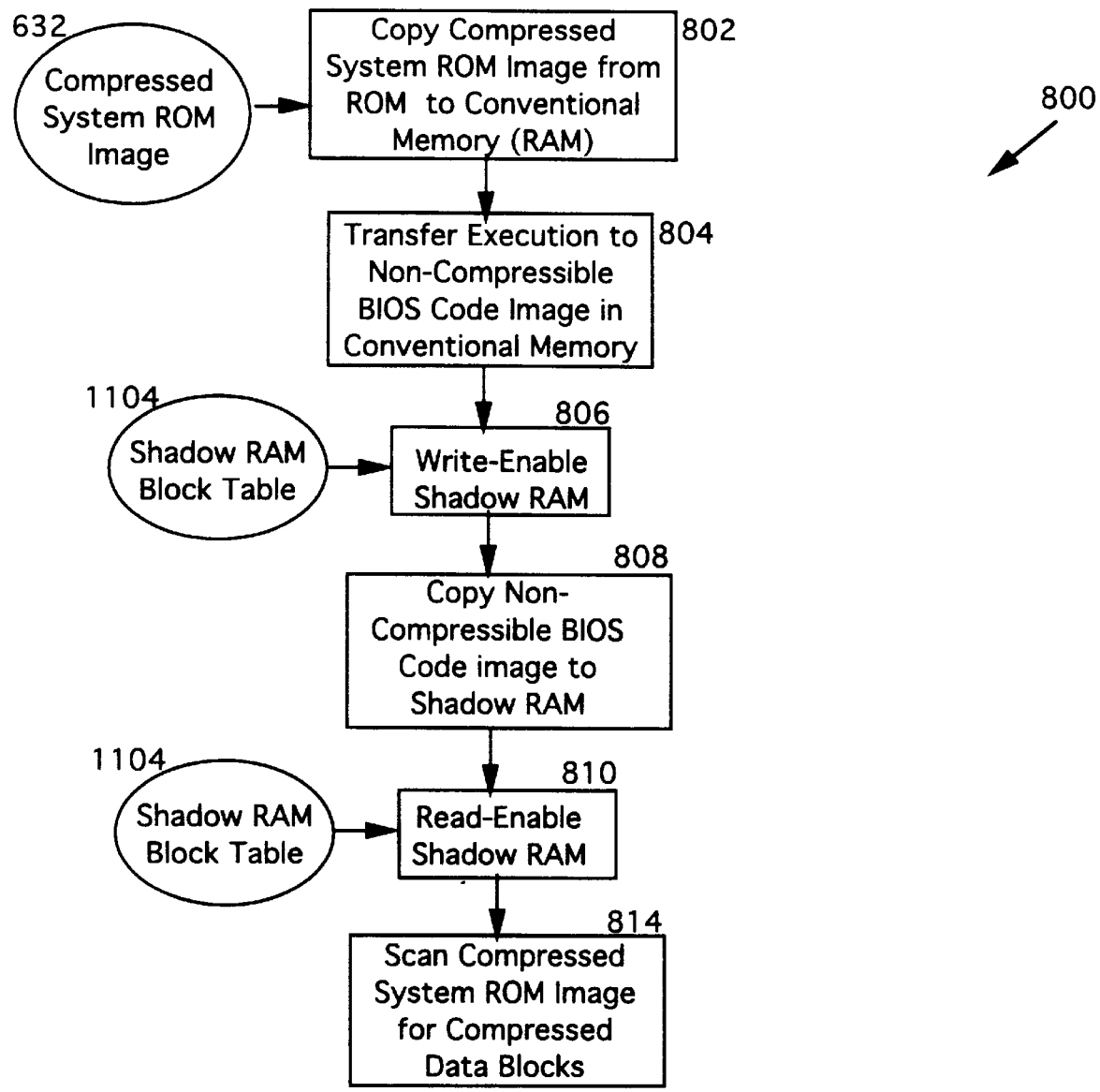
FIG. 8a is a flowchart of a method for decompressing compressed system ROM image 632.

FIG. 8a shows a flowchart of the decompression method 800 of the present invention. Compressed system ROM image 632 is copied 802 from ROM 130 to conventional memory 110, (e.g., RAM 112). Program execution control is transferred 804 to decompression program 422 (in non-compressible BIOS code image 520 of compressed system ROM image 632). In one embodiment, sufficient space in shadow RAM 202 is write-enabled 806 (i.e., using write enable procedure 1106 and reference to shadow RAM block table 1104), non-compressible BIOS code 520 is copied 808 from conventional memory 110 to the write-enabled space, and the write-enabled space is read-enabled 810 (i.e., using read enable procedure 1106 and reference to shadow RAM block table 1104).

Figure 8B:
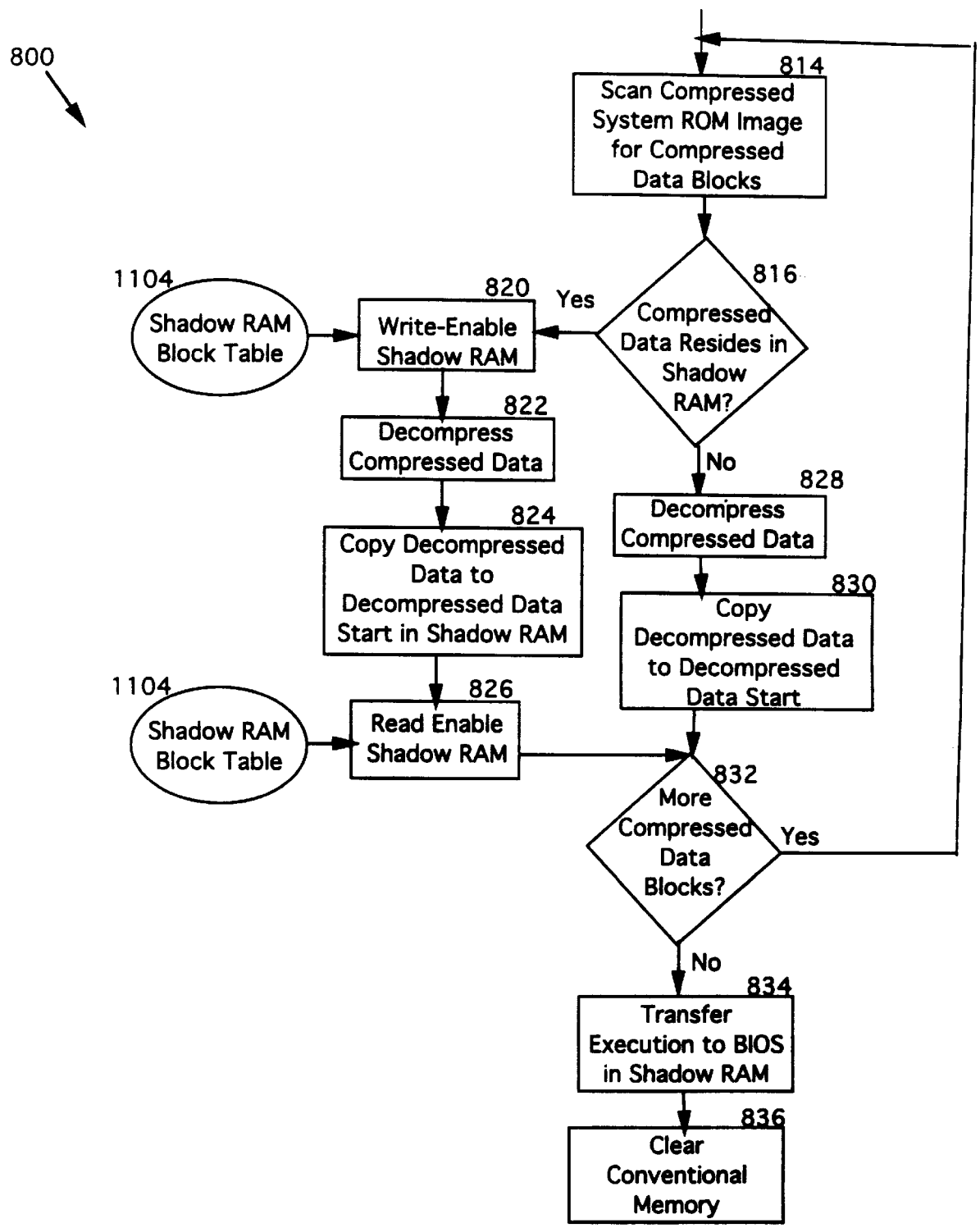

Referring now to FIG. 8b, decompression program 422 scans 814 for compressed data blocks 700. In one embodiment, a scan is made from the beginning address of compressed system ROM image 632 in conventional memory 110 by searching for a signature 712. Once found, compressed data block 700 header flags 720 are checked to determine 816 if compressed data 702 resides in shadow RAM 202 (i.e., when decompressed). If compressed data 702 resides in shadow RAM 202, reference is made to shadow RAM block table 1104 and sufficient shadow RAM space is write-enabled 820 (see above shadow RAM write-enable procedure 1106). Compressed data 702 is decompressed 822 using decompression algorithm 1102. Decompressed data 702 is copied 824 to shadow RAM 202 at the address given by decompressed data start 722. Again, with reference to shadow RAM block table 1104, the same shadow RAM blocks that were write-enabled 820 are read-enabled 826 (see above shadow RAM read-enable procedure 1108). In one embodiment, a compressible BIOS in a compressed data block 700 (i.e., from compressible BIOS code image 514) is decompressed to shadow RAM 202.

If compressed data 702 does not reside in shadow RAM 202, compressed data 702 is decompressed 828 using decompression algorithm 1102 and copied 830 to memory at the address specified in decompressed data start 722.

The decompression scan process repeats 832 until each compressed data block 700 in compressed system ROM image 632 is decompressed. In a preferred embodiment, program execution control is then transferred 834 to BIOS 310, now running in shadow RAM 202. In one embodiment, if data was decompressed to conventional (RAM) memory 110, conventional memory 110 is cleared 836 at the end of the POST process and before the operating system is booted (for compatibility reasons).

What is claimed is:

1. In a computer having a processor and storage, a computer-implemented method for generating a system read only memory (ROM) computer file that can access the ROM of a target computer, the method comprising the steps of:

receiving, for processing by the processor, a system ROM computer file comprising a non-compressible portion and one or more compressible portions, including a setup program and one or more option ROM images, the non-compressible portion comprising a decompression program;

appending, to the non-compressible portion, information on accessing the ROM of a target computer;

compressing, via the processor, each compressible portion to generate compressed data;

generating, via the processor, a compressed system ROM computer file comprising the compressed data and the appended non-compressible portion; and storing the compressed system ROM computer file in the storage.

2. The method of claim 1 wherein the system ROM computer file comprises a basic input/output system (BIOS), the BIOS comprising the non-compressible portion.

3. The method of claim 1 wherein the information on accessing the ROM comprises a table of chipset-specific information on accessing shadow RAM in the ROM address space of the target computer.

4. The method of claim 1 wherein the ROM of the target computer is shadow random access memory (RAM) in the ROM address space.

5. The method of claim 1 wherein each compressible portion is compressed into a compressed data block comprising compressed data and a location in memory of the target computer for placing the compressed data when the compressed data is decompressed.

6. The method of claim 5 wherein the location is in shadow random access memory (RAM) in the ROM address space of the target computer.

7. The method of claim 1 further comprising the step of:

storing the compressed system ROM computer file in the ROM of the target computer.

8. In a computer having a processor and storage, a computer-implement method for generating a system read only memory (ROM) computer file that can access the ROM of a target computer, the method comprising the steps of:

receiving, for processing by the processor, a system ROM computer file comprising a non-compressible portion and one or more compressible portions, including a setup program, the non-compressible portion comprising a decompression program;

appending, to the non-compressible portion, information on accessing shadow random access memory (ram) in the ROM address space of a target computer;

compressing, via the processor, each compressible portion using a lossless compression algorithm to generate compressed portions;

associating each compressed portion with a location in shadow RAM of the target computer for placing the compressed portion when the compressed portion is decompressed generating, via the processor, a compressed system ROM computer file comprising the appended non-compressible portion, the compressed portions and associated locations in memory; and storing the compressed system ROM computer file in the storage.

9. The method of claim 8 further comprising the step of:
storing the compressed system ROM computer file in the ROM of the target computer.

10. In a computer having a processor and a conventional memory and a read only memory (ROM), a computer-implement method for decompressing a compressed system ROM computer file stored in the ROM, the method comprising the steps of:

receiving, for processing by the processor, a compressed system ROM computer file comprising one or more compressed portions, including a setup program, and a non-compressed portion comprising a decompression program and information on accessing the ROM of the computer;

copying the compressed system ROM computer file from the ROM to conventional memory; and decompressing each compressed portion in the conventional memory to a location in the memory according to program instructions in the decompression program copied to the conventional memory and executed on the processor.

11. The computer-implemented method of claim 10 wherein the system ROM computer file comprises a basic input/output system (BIOS), the BIOS comprising the non-compressed portion.

12. The computer-implemented method of claim 10 wherein the compressed system ROM computer file comprises a basic input/output system (BIOS) and the BIOS is decompressed to a location in shadow RAM in the ROM address space.

13. The computer-implemented method of claim 12 further comprising the step of:

executing program instructions in the BIOS located in the shadow RAM on the processor, wherein the BIOS is executed upon exit of the decompression program.

14. The computer-implemented method of claim 10 wherein a compressed portion comprises an option ROM image.

15. The computer-implemented method of claim 10 wherein each compressed portion comprises compressed data and the location in the memory for placing the compressed data when the compressed data is decompressed.

16. The computer-implemented method of claim 15 wherein the location in memory is in shadow RAM in the ROM address space.

17. The computer-implemented method of claim 16 wherein the decompressing step further comprises the steps of:

write-enabling shadow RAM in the ROM address space according to instructions in the decompression program with reference to the information on accessing the ROM;

decompressing a compressed portion to the write-enabled shadow RAM; and read-enabling the write-enabled shadow RAM address space according to instructions in the decompression program with reference to the information on accessing the ROM.

18. The computer-implemented method of claim 10 wherein the location in memory is in the RAM address space.

19. The computer-implemented method of claim 18 further comprising the step of:

clearing the contents of the RAM upon exit of a power-on self-test process.

20. The computer-implemented method of claim 10 wherein the information on accessing the ROM comprises a table of chipset-specific information on accessing shadow RAM in the ROM address space.

21. In a computer having a processor and a memory including a random access memory (RAM) and a read only memory (ROM), a computer-implemented method for decompressing a compressed system ROM computer file, the method comprising the steps of:

receiving a compressed system ROM computer file stored in the ROM comprising a non-compressed decompression program, non-compressed information on accessing the ROM, and one or more compressed data blocks, each compressed data block comprising compressed data and an associated location in the memory to place the compressed data when decompressed;

copying the compressed system ROM computer file from the ROM to the RAM; and executing program instructions in the non-compressed decompression program in the RAM on the computer processor, wherein the non-compressed decompression program executes the steps of:

scanning the compressed system ROM computer file in the RAM for compressed data blocks; and for each compressed data block found, decompressing the compressed data from the RAM to the location in memory specified in the compressed data block.

22. The computer-implemented method of claim 21, wherein, for each compressed data block found, the decompressing step further comprises the steps of:

determining if the compressed data resides in shadow RAM in the ROM address space, and if so:

write-enabling shadow RAM in the ROM address space according to instructions in the decompression program with reference to the information on accessing the ROM; and read-enabling the write-enabled shadow RAM address space according to instructions in the decompression program with reference to the information on accessing the ROM.

23. A computer-implemented system for generating a compressed system read only memory (ROM) computer file, the system comprising:

a processor for executing program instructions;

memory, coupled to the processor, for storing instructions for execution by the processor and for storing data;

a system ROM computer file, stored in the memory, comprising one or more compressible portions, a non-compressible decompression program for decompressing the compressible portions, and non-compressible information on accessing the shadow random access memory (RAM) in the ROM of a target computer;

a compression utility, stored in the memory, comprising a lossless compression algorithm and program instructions executable on the processor for compressing each compressible portion into a compressed data block comprising compressed data and a location in memory of the target computer for placing the compressed data when the compressed data is decompressed, wherein a compressed system ROM computer file comprising the compressed data blocks, the non-compressible decompression program, and the non-compressible information is generated; and storage, coupled to the processor, for storing the compressed system ROM computer file.

24. A computer-implemented system for decompressing a compressed system ROM computer file, the system comprising:

a processor for executing program instructions;

memory, coupled to the processor, for storing instructions for execution by the processor and for storing data, the memory including a random access memory (RAM) and a read only memory (ROM); and a compressed system ROM computer file, stored in the ROM, comprising a non-compressed decompression program, non-compressed information on accessing shadow RAM in the ROM of the memory, and one or more compressed data blocks, each compressed data block comprising compressed data and an associated location in the memory to place the compressed data when decompressed, wherein the processor executes instructions in the decompression program to copy the compressed system ROM computer file from the ROM to the RAM and to decompress the compressed data from the RAM to the associated location in the memory.

25. The system of claim 24 wherein the location in memory is in shadow RAM in the ROM address space, and the processor executes instructions in the decompression program and references the information on accessing the shadow RAM, to write-enable and read-enable the shadow RAM.

26. A compressed system read only memory (ROM) computer chip, prepared by the method comprising the steps of:

receiving, for processing by the processor, a system ROM computer file comprising a non-compressible portion and one or more compressible portions, the non-compressible portion comprising a decompression program;

appending, to the non-compressible portion, information on accessing shadow random access memory (RAM) in the ROM address space of a target computer;

compressing, via the processor, each compressible portion using a lossless compression algorithm to generate compressed portions;

associating each compressed portion with a location in memory of the target computer for placing the compressed portion when the compressed portion is decompressed generating, via the processor, a compressed system ROM computer file comprising the appended non-compressible portion, the compressed portions and associated locations in memory; and storing the compressed system ROM computer file in a ROM chip.

27. In a computer having a processor and a memory including a random access memory (RAM) and a read only memory (ROM), a decompressed system ROM program, generated in accordance with the method comprising the steps of:

receiving a compressed system ROM computer file stored in the ROM comprising a non-compressed decompression program, non-compressed information on accessing the ROM, and one or more compressed data blocks, each compressed data block comprising compressed data and an associated location in the memory to place the compressed data when decompressed;

copying the compressed system ROM computer file from the ROM to the RAM; and executing program instructions in the non-compressed decompression program in the RAM on the computer processor, wherein the non-compressed decompression program executes the steps of:

scanning the compressed system ROM computer file in the RAM for compressed data blocks; and for each compressed data block found, decompressing the compressed data from the RAM to the location in memory specified in the compressed data block, thereby generating a decompressed system ROM program.

28. The program of claim 27 wherein the decompressing step further comprises the steps of:

determining if the compressed data resides in shadow RAM in the ROM address space, and if so:

write-enabling shadow RAM in the ROM address space according to instructions in the decompression program with reference to the information on accessing the ROM; and read-enabling the write-enabled shadow RAM address space according to instructions in the decompression program with reference to the information on accessing the ROM.

* * * * *